United States Patent [19]

Bryson, deceased,

[11] 3,971,652

[45] July 27, 1976

[54] AMMONIACAL EXTRACTION OF COPPER FROM METALLIC MATERIALS

[75] Inventor: Joseph Lindsey Bryson, deceased, late of Blackwell, England, by Margaret Monteith Bryson, administratrix

[73] Assignee: Metallurgical Development Company, Nassau, Bahamas

[22] Filed: Mar. 28, 1975

[21] Appl. No.: 562,894

Related U.S. Application Data

[63] Continuation-in-part of Ser. No. 334,482, Feb. 21, 1973, abandoned.

[30] Foreign Application Priority Data

Feb. 21, 1972 United Kingdom.................. 7945/72

[52] U.S. Cl.................................. 75/.5 A; 75/103; 75/117; 423/33; 423/35; 423/36; 423/24
[51] Int. Cl.$^2$..................... C01G 1/10; C22B 15/10
[58] Field of Search .......... 423/103, 117, 108, .5 A; 75/103, 117, 108, 0.5 A

[56] References Cited
UNITED STATES PATENTS

| | | | |
|---|---|---|---|
| 1,440,186 | 12/1922 | Sulman et al.................... | 423/33 |
| 2,647,830 | 8/1953 | Allen et al..................... | 423/32 |
| 2,727,819 | 12/1955 | Kenny et al.................... | 423/33 |
| 3,224,873 | 12/1965 | Swanson....................... | 75/101 BE |

FOREIGN PATENTS OR APPLICATIONS 293,939    9/1967    Australia............................. 75/103

OTHER PUBLICATIONS

Kunda et al. "Production of Copper from the Ammine Carbonate System," *Copper Metallurgy*, Ehrlich, Editor, AIME, New York 1970 pp. 27–69.
Merigold et al. "LIX64N–The Recovery of Copper from Ammoniacal Leach Solutions" *Solvent Extraction*, Soc. Chem. Ind., London (1971) pp. 1351–1355.

*Primary Examiner*—Oscar R. Vertiz
*Assistant Examiner*—Brian E. Hearn
*Attorney, Agent, or Firm*—Holman & Stern

[57] ABSTRACT

A method of leaching copper values from copper dross obtained from pyro-metallurgical lead bullion by contacting finely-divided particles of the copper dross with an aqueous ammoniacal solution, preferably a solution of ammonium carbonate and ammonium hydroxide, to dissolve copper from the dross. The leaching will usually be carried out in a gas containing free oxygen and the leaching solution may advantageously contain sulphate ions in addition to carbonate ions.

7 Claims, 1 Drawing Figure

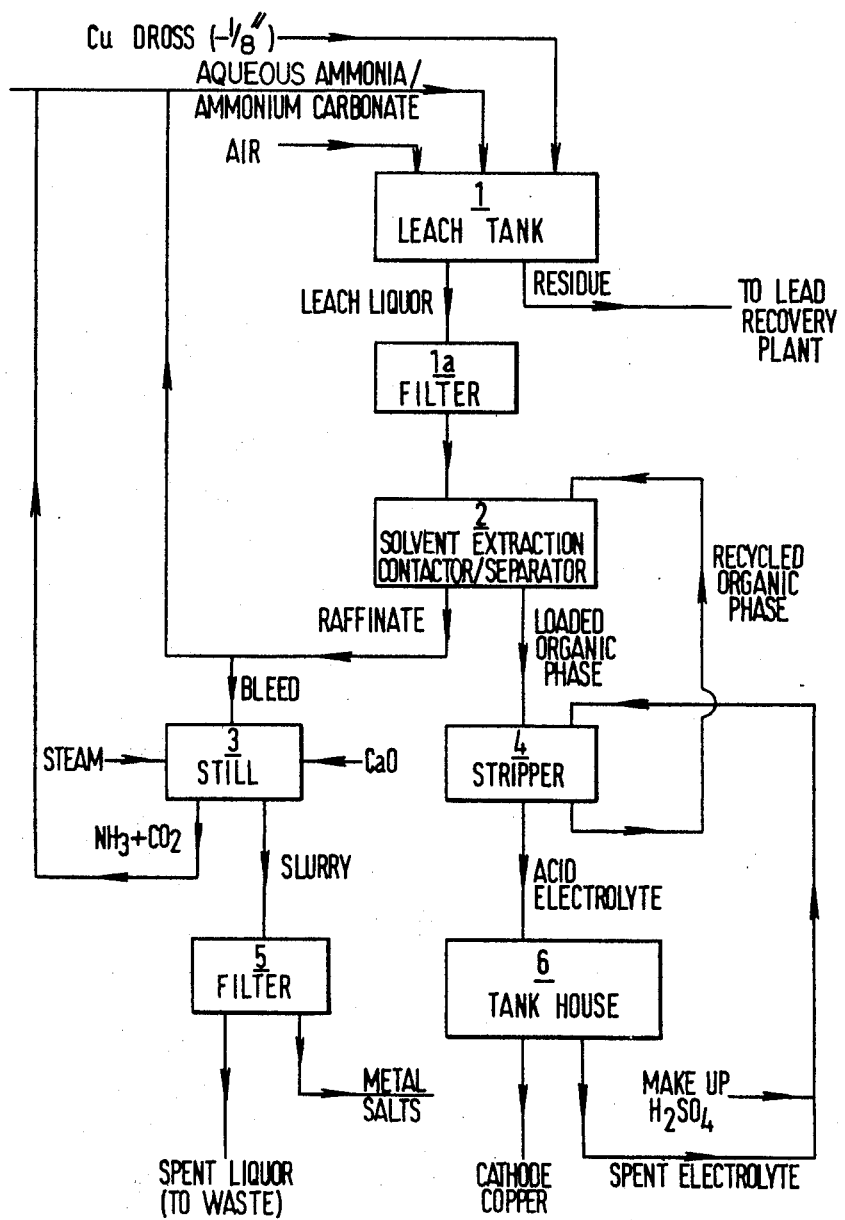

AMMONIACAL EXTRACTION OF COPPER FROM METALLIC MATERIALS

CROSS REFERENCE TO RELATED APPLICATION

This application is a Continuation-in-Part application of parent application Ser. No. 334,482, filed Feb. 21, 1973 and now abandoned.

BACKGROUND OF THE INVENTION

This invention relates to the extraction of copper from copper-containing metallic materials produced in the pyro-metallurgical smelting of zinc/lead or lead, and more particularly to the extraction of copper from copper dross obtained from pyro-metallurgical lead bullion.

The smelting of oxidic materials containing zinc, lead and other metal values with a carbonaceous fuel in a blast furnace is well known. The metal-containing materials are first agglomerated, and if necessary roasted, in a sintering process and then charged to the blast furnace with a carbonaceous solid such as coke.

Zinc vapor is condensed out of the hot gases leaving the top of the blast furnace. From the furnace bottom are tapped gangue in the form of a molten slag containing oxides and silicates of iron and calcium as major components and, as a separate phase, molten lead bullion. This lead bullion carries with it a variety of metals such as zinc, copper, silver, arsenic, antimony and others. Where copper is present in the furnace charge it will always be present in the lead bullion, usually in amounts of less than 3% by weight but possibly in amounts up to 15% by weight.

Subsequently, and preferably immediately after tapping the bullion from the furnace, the hot bullion is cooled in a controlled manner thereby causing solid particles of compounds of copper with sulphur, arsenic and other elements and of metallic copper to rise to the surface of the bullion. These solids may be skimmed off as copper dross and methods are known for drossing in such a way that only very small residual amounts of copper remain in the molten lead. In removing the copper dross from the surface of the molten lead some molten de-copperized lead and lead oxide are removed, together with some copper oxide. Copper dross may contain as little as 10% by weight of copper and over 80% by weight of lead, but with care a dross can be obtained which contains about 35% by weight of copper and only 55% by weight of lead.

Methods of working up this copper dross are already known. For example the dross can be smelted with iron and sulphur, for example in the form of pyrites, to form bullion containing some copper and an iron-copper matte containing some lead. This matte is then converted, the blister copper cast into anodes, and the anodes refined electrolytically, as in conventional copper refining practice. However, the setting up of a plant to operate such a process is scarcely economically practicable in the context of a zinc/lead blast furnace since the amounts of copper arising in such a process are relatively small.

The copper in copper dross appears to be elemental or combined copper, for example as copper sulphides or arsenides, embedded in a matrix of de-copperized metallic lead and it has previously been believed that extraction of this copper using conventional extraction agents would be difficult.

In British Patent Specification No. 1,303,070 there is described a process in which copper dross is leached with dilute aqueous sulphuric acid in the presence of a gas containing free oxygen to produce soluble copper salts.

SUMMARY OF THE INVENTION

The invention consists in a method of leaching copper values from copper dross obtained from pyro-metallurgical lead bullion, comprising contacting finely-divided particles of the copper dross with an aqueous ammoniacal solution to dissolve copper from the dross.

The leaching is preferably carried out in the presence of an oxidizing gas, for example air or oxygen. Alternatively, the leachate solution is subsequently treated with an oxidizing gas to oxidize cuprous to cupric ions.

If an ammoniacal solution is used to leach copper dross by the method according to the preceding paragraph then less impurities are extracted into the copper-rich solution than when an acid leach is used. In particular, less iron, arsenic, and antimony are taken up by such alkaline leaching than with acid leaching. As a result, less difficulty is encountered in purification of the solution obtained by leaching since organic solvents are known which will selectively extract copper from ammoniacal solutions in preference to other elements such as iron, zinc and arsenic.

Preferably the ammoniacal leaching solution is an aqueous solution of ammonium carbonate and ammonium hydroxide.

The leaching solution may be produced by carbonating ammoniacal liquor with carbon dioxide, for example from a smelting furnace.

More preferably the leaching solution contains sulphate ions in addition to carbonate ions. The mole ratio of carbonate to sulphate in the leaching solution should be from 1:3 to 3:1. The presence of the sulphate ions in the leaching solution is believed to give rise to the following advantages:

a. A reduction in the ratio of impurity elements, particularly lead and zinc, to copper in the leachate solution.
b. A reduction in the amount of copper lost in the filter cake after filtration of the residue.
c. A lower partial pressure of ammonia over the leaching solution.

The leachate solution from the leaching process, after filtration, is preferably contacted with an organic solvent which is a specific extractant for copper to take copper into the organic phase and from which copper can be subsequently extracted back into an aqueous solution by contact with an aqueous mineral acid, for example dilute sulphuric acid or hydrochloric acid. Suitable organic extractants are that sold by General Mills Inc. under the trade-name "LIX 64N" and that produced by Shell and described by Van der Zeeuw in Dutch Patent Application 71-06860 (published 21.11.71.) Such solvents can be generally classed as hydroxy-oximes.

The aqueous copper sulphate solution produced by contacting the organic solvent with dilute sulphuric acid may be utilized either in the production of copper sulphate crystals by an evaporation/crystallization process or as an electrolyte for the production of cathode copper by electrowinning. In general, copper sulphate produced by this process is comparable in purity with copper sulphate from other sources. The leachate solution may alternatively be either boiled, to precipitate a basic copper carbonate or sulphate, or treated with a reducing agent to obtain metallic copper, for example in powder form.

The ammoniacal leaching solution is suitably maintained at a temperature between 20° and 100°C. Preferably the pH value of the leaching solution is at least 9.0, more preferably from 9.5 to 10.5.

Advantageously the copper dross is vigorously agitated during the leaching process, preferably in contact with an oxygen-containing gas. The leaching solution may be circulated to keep the dross in suspension.

Preferably the dross is sized to $-\frac{1}{8}$ inch particles before leaching.

The leaching solution may suitably contain at least 15 g/l of ammonia (expressed as $NH_3$). Preferably the leaching solution contains at least 5 grams of $Cu^{++}$ per liter, since it has been found that the reaction proceeds more rapidly in the presence of cupric ions.

The process may be carried out under a range of conditions. When carrying out the process it is essential to ensure good liquid/solid contact when dissolving the copper from the dross, and good contact with the liquid of the oxygen-containing gas in order to obtain the fastest rates of solution of the copper in the leaching solution. Methods for achieving this are well known; for example, efficient mixing in a tank by means of a high speed turbine, tumbling in a rotating vessel, fluidization or slurry circulation are suitable methods, whether batchwise or continuous. Alternatively, percolation leaching may be employed in which the liquid is allowed to flow through a heap or bed of the granular dross. In this case it is particularly preferred that the liquid contains some pre-formed cupric ammine to dissolve the metallic copper since little oxidation is possible in the bed, and that the resultant cuprous ammine be oxidized separately, partly for recycling and partly for clarification and extraction.

The ammonia, carbonate and sulphate concentrations are not critical. At the lower concentrations the limits are primarily economic in that excessively dilute solutions require proportionately large tankage and pumping energy consumption. At the upper concentrations the limits are set by known solubility and stability considerations.

The proportions of ammonia to ammonium salt are not critical. The actual copper dissolved is frequently in excess of stoichiometric for the complex carbonate $Cu(NH_3)_4CO_3$, for example from about 1.3 gA Cu to $1M(NH_4)_2CO_3$, $2M$ $NH_3$ and is limited by ammonia plus ammonium ions in solution rather than by the cation. Lower proportions of ammonia tend to permit basic carbonate to be precipitated while higher proportions give solutions of unnecessarily high ammonia partial pressures and lead to troublesome loss of ammonia by entrainment in spent oxidizing gas. Higher proportions of ammonia also load the extractant, reducing copper transfer, and hinder clean and easy disengagement of the extractant.

The preferred molar proportions of ammonia to ammonium salt are 0.5 to 4.0 $NH_3$ : $1:0(NH_4)_2X$, where X is a carbonate and/or sulphate, but ratios of about 0.1 to 10:1 may be used. The total free and combined ammonia should amount to about 3.0 to 4.0 M: lgA Cu to be dissolved, plus suitable allowance for vaporization and loss. The preferred copper concentration in leach liquor is 20 to 100 gpl with appropriate ammonia and ammonium salt in proportion, but efficient operation of the process is possible at about 1 to 200 gpl copper.

The initial leaching solution may be copper free provided that enough oxygen is present to allow the desired copper dissolution, but it is preferred to have an appreciable amount of cupric ammine in solution which can then quickly dissolve metallic copper, in accordance with the reaction

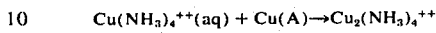

$$Cu(NH_3)_4^{++}(aq) + Cu(A) \rightarrow Cu_2(NH_3)_4^{++}$$

for subsequent or simultaneous oxidation. The raffinate is practically never completely free of copper after Lix 64N extraction, so this criterion is achieved in a cyclic process. It should be noted that one gram atom of cupric ion as ammine yields two gram atoms of cuprous ion as ammine after reaction without the need for oxidation in the actual leaching reactor, so that it is desirable to feed a raffinate solution containing 50% of the required copper concentration to the leaching reactor, which will yield a leach liquor containing the required concentrations as cuprous ammine, given enough copper and adequate reaction conditions in the reactor. This solution can then be oxidized separately, thus allowing design freedom in plant construction and operation. The temperature of reaction is conveniently at or near 20°C, but may be from 0° to 100°C, given adequate plant design and operation. The range 20° to 50°C is preferred.

Recovery of the copper is preferably carried out by a solvent extraction process, particularly by contact with a solution in kerosene of a hydroxy oxime such as Lix 63, Lix 64 or Lix 64N, which are proprietary materials manufactured and sold by General Mills Inc., or with the extractant described by Van der Zeeuw in Dutch Patent Application No. 71-06860. The extractant is diluted with an inert organic solvent substantially insoluble in water, for example a high flash point kerosene, and is used at 1 to 40% v/v. The extraction is carried out by countercurrent contacting of the two liquid phases by processes and in equipment known in the art. The aim is to make the copper dissolve substantially in the organic phase as its complex with the extractant, followed by rapid and clean separation of the two phases for subsequent processing. The most useful equipment is a mixer-settler, but variants such as spray columns, packed columns, pulsating plate columns, rotating disc contactors, and centrifugal contactors may be used. The number of stages of extraction required is not critical. In a cyclic process, it may be desired to leave some copper, for example 5 to 10 gpl, in the raffinate to speed copper dissolution. In this case, extraction is not carried out to completion, and in general fewer stages are needed than where complete extraction is desired. A single or two stages are frequently adequate.

The loaded organic phase containing copper and trace elements may be washed with weak acid, for example aqueous sulphuric acid solution at pH 2 to 5, to remove zinc and ammonia before stripping. Stripping is carried out by treatment of the loaded organic solution with strong aqueous acid, in particular with sulphuric acid at about 150 to 200 gpl free acid, in similar equipment to that used for extraction. Again the number of stages required may vary with circumstances and is not critical. The prime requirement is to reduce the copper content of stripped organic to an economically low level, for example about 0.5 gpl, in order to obtain maximum practicable copper transfer capacity of the organic phase. In the case of Lix 64N, about 0.4g copper dissolves in 1 liter of kerosene solution containing 10 ml of extractant, and proportionately for higher Lix 64N concentrations. About 40 v/v % of Lix 64N is the usual maximum concentration, that is about 16 gpl copper. If 0.5 gpl is left in stripped organic, the transfer of 15.5 gpl copper is defined as the transfer capacity. The relative flow rates and copper transfer of the leach liquor/raffinate, loaded/stripped organic, and strip/recycle liquor must relate to the mass of copper transferred in unit time.

When leaching copper dross obtained from lead blast furnace bullion, the copper compounds generally require more vigorous oxidation conditions to dissolve the copper values than does zinc/lead blast furnace dross. In particular, super-atmospheric pressures of oxygen and elevated temperatures are required to obtain acceptable rates of dissolution for a production unit, for example 1 to 5 atmospheres oxygen partial pressure and temperatures of 30° to 100°C are suitable ranges of conditions for use with this material.

BRIEF DESCRIPTION OF THE DRAWING

The invention will be further described with reference to the accompanying drawing which is a flowsheet illustrating the extraction of copper from copper dross obtained from pyro-metallurgical lead bullion.

DETAILED DESCRIPTION OF THE PREFERRED EMBODIMENT

In the flow sheet shown in the drawing, copper dross (reduced to $-\frac{1}{8}$ inch particles) together with aqueous ammonia/ammonium carbonate solution and air are fed into a leaching tank 1. Pregnant liquor, containing dissolved copper values, is fed after filtration in a filter 1a into a solvent extraction contactor 2.

Raffinate, separated from the organic phase in the contactor 2, is recycled to the leaching stage, with a bleed being fed to a still 3 which permits removal of impurities such as zinc, nickel and arsenic from the leach circuit. The slurry from the still is filtered by a filter 5 to give insoluble inorganic salts, such as zinc and nickel hydroxides and carbonates and calcium arsenate.

The loaded organic phase from the solvent extraction contactor 2 is fed to a stripper 4 where copper values are extracted into an aqueous sulphuric acid solution and thence recycled to the contactor 2. This solution is fed to a tank house 6 in which copper is recovered, by electrolytic deposition, as cathode copper. Spent electrolyte reinforced with make up sulphuric acid is recycled to the stripper 4. Spent liquor from the filter 5 is discharged to waste as is a bleed of spent electrolyte necessary to control impurity levels.

The invention will be further described with reference to the following examples.

EXAMPLE 1

The extraction of metal values from copper dross and formation of basis copper carbonate from the leachate Dry copper dross (118.8g., 29.3g Cu: −10 B.S.S.) was suspended in an aqueous solution (500 ml) of 4M $NH_4OH$, $2M(NH_4)_2CO_3$ while air (liter/min.) was introduced from a sintered glass disc immersed in the solution. The temperature rose from 19° to 33° over 2 to 2.5 hr, then dropped to 21° at 5 hr. The spent air was scrubbed with acid. Periodic analysis of the leachate and of the ammonia entrained in spent air gave the following results:

| Time - hr. | 1 | 2 | 3 | 4 | 5 |
|---|---|---|---|---|---|
| Copper concentration, gpl. | 16 | 35 | 42 | 46 | 50 |
| Average oxygen efficiency, % | 12 | 13 | 10 | 9 | 7 |
| Ammonia* removed, %. | 3.9 | 7.9 | 10.8 | 13.8 | 15.2 |
| Approximate* copper extraction, % | 25 | 56 | 68 | 73 | 80 |

*Based on total input ammonia/ammonium, and copper

The mixture gave on filtration a filter cake 96.3g., washed and dried at 100°C) and a dark blue cuprammonium carbonate solution (440 mil.) which was steam distilled, forming a dark green impure copper carbonate (39.9g., 52.5% Cu, washed and dried). The mass balance for the major elements was as given in the Table below.

| | Copper | | Lead | | Zinc | | Iron | | Antimony | | Arsenic | | Silver | |
|---|---|---|---|---|---|---|---|---|---|---|---|---|---|---|
| % in Cu Dross | 24.67 | | 57.9 | | 3.66 | | 3.54 | | 1.11 | | 1.74 | | 0.146 | |
| Conc: in Leachate (g/l) | 49.1 | | 0.795 | | 3.975 | | 0.1136 | | 0.318 | | 2.27 | | 0.0068 | |
| | (g) | % | (g) | % | (g) | % | (g) | % | (g) | % | (g) | % | (g) | % |
| Leachate Washings | 23.3 | 79.5 | 0.39 | 0.57 | 1.94 | 44.6 | 0.06 | 1.43 | 0.16 | 12.12 | 1.11 | 53.6 | 0.003 | 1.73 |
| Washed & dried dross residue | 6.0 | 20.5 | 68.4 | 99.43 | 2.41 | 55.4 | 4.15 | 98.57 | 1.16 | 87.78 | 0.96 | 46.4 | 0.17 | 98.27 |
| Totals | 29.3 | 100 | 68.79 | 100 | 4.35 | 100 | 4.21 | 100 | 1.32 | 100 | 2.07 | 100 | 0.173 | 100 |
| Basic Carbonate Precipitate | 20.9 | — | 00.35 | — | 1.75 | — | 0.05 | — | 0.14 | — | 1.0 | — | 0.003 | — |

EXAMPLE 2

Effect of copper concentration on the rate of extraction of copper dross

Samples of the $-\frac{1}{8}$ inch dross (20 g., 26.8% Cu) were extracted, in the usual way, with air (1 liter $min^{-1}$) and ammine carbonate solutions (500 mls) at room temperature. These solutions, containing various concentrations of copper, were prepared by blending ammine carbonate solution with the filtrate obtained by reacting copper with a similar ammine carbonate solution. In this way the concentration of free ammonia was almost identical in all the extractions and only the copper concentration was varied. The results show the marked effect of residual copper in raffinate returned for reuse in causing rapid dissolution of copper from the dross.

| Time (mins) | 0 | 5 | 15 | 30 | 90 | Copper content of initial solution(g/l) |
|---|---|---|---|---|---|---|
| Temp. (°C) | 14.5 | 16.1 | 17.6 | 19.7 | 19.4 | |
| Copper in solution(g/l) | 0 | 1.21 | 4.52 | 8.55 | 10.70 | 0 |
| Cum.increase(g/l) | 0 | 1.21 | 4.52 | 8.55 | 10.70 | |
| Temp.(°C) | 18.8 | 20.5 | 22.8 | 22.3 | 19.8 | |
| Copper in solution(g/l) | 6.57 | 9.66 | 13.60 | 16.40 | 17.15 | 6.57 |
| Cum.increase(g/l) | 0 | 3.09 | 7.03 | 9.83 | 10.55 | |
| Temp. (°C) | 18.8 | 20.5 | 22.8 | 22.3 | 19.8 | |
| Copper in solution(g/l) | 9.24 | 13.06 | 17.08 | 18.77 | 20.08 | 9.24 |
| Cum.increase(g/l) | 0 | 3.82 | 7.84 | 9.53 | 10.84 | |
| Temp.(°C) | 21.6 | 23.7 | 23.7 | 21.8 | 20.3 | |
| Copper in solution(g/l) | 12.52 | 16.86 | 20.7 | 22.10 | 23.26 | 12.52 |
| Cum.increase (g/l) | 0 | 4.34 | 8.19 | 9.58 | 10.74 | |

This table shows that at least 5 g/l of copper in the leaching solution considerably speeds up the leaching process.

EXAMPLE 3

A complete leaching organic extraction, stripping and electroylsis circuit

Five cycles were operated as follows:

a. Leaching

Dross (−⅛ inch, 26.8% Cu., 20g.) was leached in recycled ammine carbonate (100 ml.) with aeration (1 liter/min) for 80–120 min. Ammonia and carbon dioxide were added as make up when needed. About 10% of the copper was left in the residue, 80–84% was obtained in clear filtrate, about 9% was entrained in the residue and required washing to be removed. Washing of the raffinate with kerosene was necessary in the later cycles, to remove entrained Lix 64N solution which caused foaming during leaching.

b. Extraction into Organic Phase

The filtrate in each cycle (80 ml.) was extracted with 30% v/v Lix 64N (General Mills Tradename) (6 × 80 ml.) to transfer all of the copper to the organic phase. The six Lix solutions were kept in separating funnels numbered 1-6. In the second and subsequent cycles, the Lix solutions were washed successively with water (6 × 80 ml.), progressing from shaker/settler 6 to 1, to remove ammonia entrained in the Lix solution.

c. Stripping into Aqueous Phase

Stripping was accomplished with synthetic spent electrolyte (30 gpl Cu, 180 gpl. $H_2SO_4$) by shaking portions (6 × 80 ml.) with Lix solution, progressing from shaker-settler 6 to 1. Subsequent stripping cycles used electrolyte from the electrolysis stage. The pregnant electrolyte was frothed with air or washed with kerosene before electrolysis to separate traces of entrained Lix solution which interfered with copper deposition.

d. Electrolytic Deposition

Electrolysis was carried out in a standard apparatus for copper analysis by deposition, using platinum electrodes, giving bright, clean and even copper deposits from pregnant electrolyte which had been frothed, but lumpy uneven deposits from that which had only been washed with kerosene. The copper was finally stripped with nitric acid for analysis.

Results

The results obtained from the operation are given below.

Analyses

| Solution | Cycle No. | Cu | As | Pb | Analyses gpl Zn | Fe | Sb | Ni | Solution Volume, ml. |
|---|---|---|---|---|---|---|---|---|---|
| Ammine | 2 | | 2.4 | | 6.1 | 0.023 | 1.3 | 0.02 | 78 |
| Raffinate | 5 | | 2.6 | | 7.5 | 0.023 | 1.3 | 0.02 | 78.5 |
| Spent | 1 | 29.6 | 0.03 | 0.01 | 0.02 | 0.023 | 0.08 | | 450 |
| Electrolyte | 3 | 28.1 | 0.05 | 0.01 | 0.11 | 0.039 | 0.04 | | 466 |
| | 5 | 30.0 | 0.03 | 0.01 | 0.16 | 0.047 | 0.04 | | 459 |
| Cathode | 1 | 41.9 | <0.01 | <0.01 | <0.01 | <0.007 | 0.03 | | 100 |
| Copper* | 3 | 40.4 | <0.01 | <0.01 | <0.01 | <0.007 | 0.04 | | 100 |
| | 5 | 30.8 | <0.01 | 0.01 | 0.01 | <0.007 | <0.03 | | 100 |

*After dissolution in aqueous nitric acid

The behavior of the impurity elements is briefly as follows:

Lead: Largely left as a metallic and carbonated residue, but follows copper into the extractant solution.

Arsenic: Builds up to 2.5 – 3 gpl in raffinate, largely left there on copper extraction, and the remainder rejected in dross residue.

Nickel: Builds up in raffinate, probably follows copper through the process.

Zinc: Builds up to about 7–10 gpl in raffinate, remainder rejected in dross residue, but some follows copper through process.

Iron: Trace amounts go through process, most is rejected in dross residue.

Antimony: Largely rejected in dross residue, but some follows copper through process.

EXAMPLE 4

Effect of Sulphate on Leaching Process

The following leaching experiments were carried out in a spherical glass flask fitted with a paddle stirrer, an air inlet through a sintered glass disc, a thermometer and a gas offtake through a water cooled reflux condenser to a scrubber solution of sulphuric acid.

The copper dross contained 29.3% copper, and was screened to −⅛ inch (ca 3 mm). Aqueous solutions containing mixture of ammonia and ammonium carbonate and/or sulphate were prepared as follows.

2 molar ammonium hydroxide, plus:
a. 1M $(NH_4)_2 CO_3$;
b. 0.75M $(NH_4)_2 CO_3$, 0.25M $(NH_4)_2 SO_4$;
c. 0.5M $(NH_4)_2 CO_3$, 0.5M $(NH_4)_2 SO_4$;
d. 0.25M $(NH_4)_2 CO_3$, 0.75M $(NH_4)_2 SO_4$;
e. 1M $(NH_4)_2 SO_4$.

The flask was charged with the appropriate solution (1 l.) at about 20°C. While stirring vigorously, copper dross (200g.) was added, the flask sealed and air (1 l/min) bubbled through the solution. Copper dissolution started fairly quickly, and reaction was continued for 2 hr. except when noted. The temperature rose spontaneously to about 40°C, except that when no carbonate was present, the dissolution of copper was so slow that the exotherm was very much less pronounced.

Each slurry of dross residue and leach liquor was filtered under standard conditions, and the clear liquor extracted by shaking with Lix 64N (General Mills Trade name) in kerosene (25 v/v%) until all the copper had been loaded into the organic phase. The loaded organic was washed with water, then stripped with aqueous sulphuric acid (180gpl.) yielding an acidic copper sulphate solution and a stipped organic phase suitable for recycle. The ammonium liquor, raffinate, stripped of copper, was suitable for treatment of a fresh quantity of dross after make up of losses.

The results of the experiments are given as follows.

It is apparent that several advantages arise when using carbonate plus sulphate mixture to leach this copper dross, and that several disadvantages arise with sulphate as the only anion thus:

1. The rapid reaction rate of a system containing only carbonate anion is maintained, at least to 75M% sulphate 25M% carbonate. It is very slow with only sulphate present.
2. Progressively less arsenic, antimony and lead are dissolved by the leach liquor in proportion to the copper as the sulphate content increases. Very substantial amounts of lead can be dissolved when only sulphate is present.
3. The dross residue (approximately half of which in the case of carbonate only is a very fine, slow settling and filtering material) becomes progressively coarser, more readily filtered and holds less liquor in the cake as the sulphate content is increased.
4. Progressively less ammonia is lost by entrainment in spent air as the sulphate content increased.
5. When extracting with specific copper extractants, lead transfer in relation to copper decreases steadily with increasing sulphate content in the liquor, but then increases sharply at a 100% sulphate liquor. This is particularly important as lead transferred to such extractants is stripped in the acid treatment stage. When sulphuric acid is used, much of the lead sulphate forms a precipitate which collects at the interface between the extractant solution and the acid, enhancing "crud" formation and rendering difficult the clean separation and complete recovery of the expensive extractant. The remainder dissolves in the sulphuric solution enforcing measures to avoid contamination of the cathode copper or copper salt.

Thus by maintaining a mole ratio of carbonate to sulphate in the leaching solution between 1:3 and 3:1 the above advantages are achieved.

I claim:

1. A method of leaching copper values from copper dross obtained from pyro-metallurgical lead bullion, comprising contacting finely-divided particles of the copper dross in the form of a metallic lead matrix containing copper and copper compound inclusions with A. Leaching and leach liquor details
Leach Liquor 2M $NH_4OH$, 1M $(NH_4)_2 X$ (X=$CO_3''$ and/or $SO_4''$)

| pH Initial | pH Final | %Cu[1] | Analysis gpl Cu | Pb | Zn | Fe | Ni | Sb | As | Filter Cake[4] Moisture % | Entrained $NH_3$, %[5] |
|---|---|---|---|---|---|---|---|---|---|---|---|
| 10.15 | 11.25 | 85 | 50.6 | 0.27 | 3.9 | <0.01 | 0.07 | 0.4 | 1.6 | 7.1 | 7.8 |
| 10.15 | 10.80 | 81 | 47.9 | 0.23 | 4.4 | 0.039 | 0.07 | 0.6 | 1.2 | 4.3 | 6.5 |
| 10.15 | 10.50 | 78[2] | 46.1 | 0.13 | 4.4 | 0.078 | 0.07 | 0.6 | 0.8 | 2.8 | 5.4 |
| 10.10 | 10.10 | 81 | 47.8 | 0.05 | 4.0 | 0.023 | 0.07 | 0.5 | 0.4 | 1.9 | 5.7 |
| 10.05 | 9.75 | 26[3] | 15.5 | 0.15 | 4.4 | <0.01 | 0.02 | <0.1 | <0.01 | 3.3 | 5.3 |

[1] Cu in liquor plus filter cake washing as percentage of Cu in dross charged.
[2] 100 min. reaction.
[3] 6 hr reaction.
[4] Volume of entrained liquid as percentage of total liquor.
[5] Ammonia entrained in spent air based on total ammonia/ammonium.

B. Proportions of impurity elements extracted from ammine leachate based on unit weight of copper

| Series 1 | Cu | Pb | Zn | Fe | Ni | Sb | As |
|---|---|---|---|---|---|---|---|
| a | 1.0 | 0.0022 | 0.0091 | <0.0002 | 0.001 | 0.0011 | 0.002 |
| b | 1.0 | 0.0033 | 0.030 | 0.0008 | 0.0014 | 0.0023 | ~0 |
| c | 1.0 | 0.0028 | 0.019 | 0.0017 | 0.0012 | 0.0035 | ~0 |
| d | 1.0 | 0.0010 | 0.0176 | 0.0005 | 0.0014 | 0.0033 | 0.002 |
| e | 1.0 | 0.0097 | 0.098 | <0.0006 | ~0.001 | <0.006 | ~0 | an aqueous ammoniacal solution to dissolve copper from the dross, wherein the leaching solution further contains both sulphate and carbonate ions, the ammonium concentration being at least 15 grams per liter, expressed as $NH_3$, there being from 0.5 to 4.0 moles of ammonia per mole of total carbonate and sulphate ions, and the mole ratio of sulphate to carbonate in the leaching solution being from 1:3 to 3:1.

2. The method as claimed in claim 1 comprising carrying out the leaching in the presence of an oxidizing gas.

3. The method as claimed in claim 1 further comprising subsequently treating the leachate solution with an oxidizing gas to oxidize cuprous to cupric ions.

4. The method as claimed in claim 1 wherein the temperature of the leaching solution is maintained at between 20° and 100°C.

5. The method as claimed in claim 1 wherein the pH value of the leaching solution is between 9.0 and 10.5.

6. The method as claimed in claim 1 further comprising stripping the leachate solution of ammonia to yield a solid copper salt precipitate.

7. The method as claimed in claim 1 further comprising recovering copper powder in the leachate solution by treatment with a reducing agent.

* * * * *

UNITED STATES PATENT AND TRADEMARK OFFICE
CERTIFICATE OF CORRECTION

PATENT NO. : 3,971,652
DATED : July 27, 1976
INVENTOR(S) : Joseph Lindsey Bryson, et al.

It is certified that error appears in the above-identified patent and that said Letters Patent are hereby corrected as shown below:

On the cover sheet, Item [73] Assignee should read:

-- Metallurgical Processes Limited and I.S.C. Smelting Limited, London, England --.

Signed and Sealed this

First Day of February 1983

[SEAL]

*Attest:*

*Attesting Officer*

GERALD J. MOSSINGHOFF

*Commissioner of Patents and Trademarks*